(12) United States Patent
Wang et al.

(10) Patent No.: US 12,730,074 B2
(45) Date of Patent: Sep. 8, 2026

(54) NON-DESTRUCTIVE IN-SITU MEASUREMENT DEVICE AND METHOD FOR HIGH-COMPLEXITY STRUCTURES BASED ON RAMAN ANALYSIS

(71) Applicant: Tsinghua University, Beijing (CN)

(72) Inventors: Chen Wang, Beijing (CN); Simian Zhang, Beijing (CN); Yuqi Wang, Beijing (CN); Xiaonan Deng, Beijing (CN); Yifei Wu, Beijing (CN); Zhengcao Li, Beijing (CN)

(73) Assignee: Tsinghua University, Beijing (CN)

( * ) Notice: Subject to any disclaimer, the term of this patent is extended or adjusted under 35 U.S.C. 154(b) by 24 days.

(21) Appl. No.: 18/897,514

(22) Filed: Sep. 26, 2024

(65) Prior Publication Data

US 2025/0020595 A1 Jan. 16, 2025

Related U.S. Application Data

(63) Continuation of application No. PCT/CN2023/084821, filed on Mar. 29, 2023.

(30) Foreign Application Priority Data

Mar. 30, 2022 (CN) ......................... 202210321961.7
Apr. 7, 2022 (CN) ......................... 202210373807.4

(51) Int. Cl.
*G01N 21/65* (2006.01)

(52) U.S. Cl.
CPC ... *G01N 21/65* (2013.01); *G01N 2201/06113* (2013.01); *G01N 2201/0638* (2013.01)

(58) Field of Classification Search
CPC .................. G01N 21/65; G01N 21/01; G01N 2201/06113; G01N 2201/0638;
(Continued)

(56) References Cited

U.S. PATENT DOCUMENTS 9,958,324 B1 * 5/2018 Marquardt ............ G01J 3/0208
10,942,116 B2 * 3/2021 Prater .................... G01N 21/35
(Continued)

FOREIGN PATENT DOCUMENTS

CN 202522515 11/2012
CN 104134616 11/2014
(Continued)

OTHER PUBLICATIONS

ISR, International Search Report issued in Application No. PCT/CN2023/084821 mailed on Jun. 30, 2023, 3 pages.

*Primary Examiner* — Sang H Nguyen
(74) *Attorney, Agent, or Firm* — Henry Patent Law Firm PLLC

(57) ABSTRACT

The present disclosure relates to a non-destructive in-situ measurement device and method based on Raman analysis. The device comprises: a laser light source that emits a laser beam; a focusing component that focuses the laser beam above a movable sample stage, with the focal plane of the focusing component positioned at an initial position. During measurement, the focal plane is controlled to move from the initial position to the surface, side, or bottom of the structure under test. The movable sample stage holds the sample to be measured and can move in a plane perpendicular and/or parallel to the optical axis. The axis of the structure under test is parallel to the optical axis and located within the laser beam's focal region. A detection module collects specific Raman scattering signals returned from the sample under test, and the structure's planar and three-dimensional parameters are determined based on the collected results.

11 Claims, 7 Drawing Sheets

(58) Field of Classification Search
CPC ............ G01N 2021/0112; G01B 11/24; G01B 11/303; G01B 2210/56
See application file for complete search history.

(56) References Cited

U.S. PATENT DOCUMENTS

| | | | | |
|---|---|---|---|---|
| 2006/0132798 | A1* | 6/2006 | Usui | H01J 37/32963 356/504 |
| 2008/0129992 | A1* | 6/2008 | Matousek | G01N 21/65 356/301 |
| 2010/0241357 | A1* | 9/2010 | Chan | G01N 21/65 702/179 |
| 2013/0157388 | A1* | 6/2013 | Grimbergen | H10P 74/238 257/E21.528 |
| 2014/0110259 | A1* | 4/2014 | Takahashi | G01N 21/658 204/603 |
| 2015/0062578 | A1* | 3/2015 | IvanPetrov | G01N 21/84 356/326 |
| 2016/0018334 | A1* | 1/2016 | Tomar | G01L 1/24 356/301 |
| 2016/0161730 | A1* | 6/2016 | Nakamura | G01B 11/22 356/498 |

FOREIGN PATENT DOCUMENTS

| | | |
|---|---|---|
| CN | 110178019 | 8/2019 |
| CN | 111965164 | 11/2020 |
| CN | 112697830 | 4/2021 |
| CN | 114778514 | 7/2022 |
| CN | 105547543 | 5/2026 |
| JP | H085471 | 1/1996 |
| JP | 2007134531 | 5/2007 |
| WO | 2023185950 | 10/2023 |

* cited by examiner

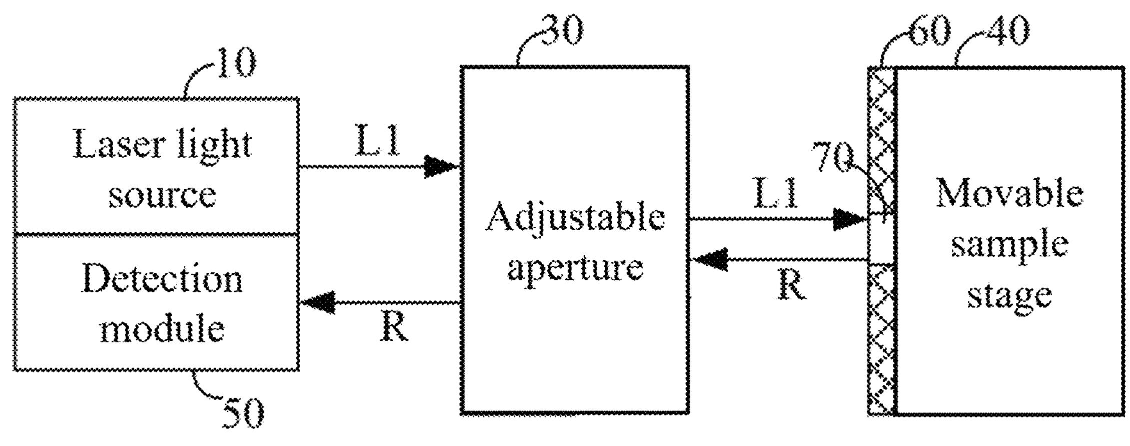
Figure 1
10
Laser light source
Detection module
50
L1
R1
20
Adjustable aperture
30
Focusing component
L1
R
70
60
40
Movable sample stage
Figure 2
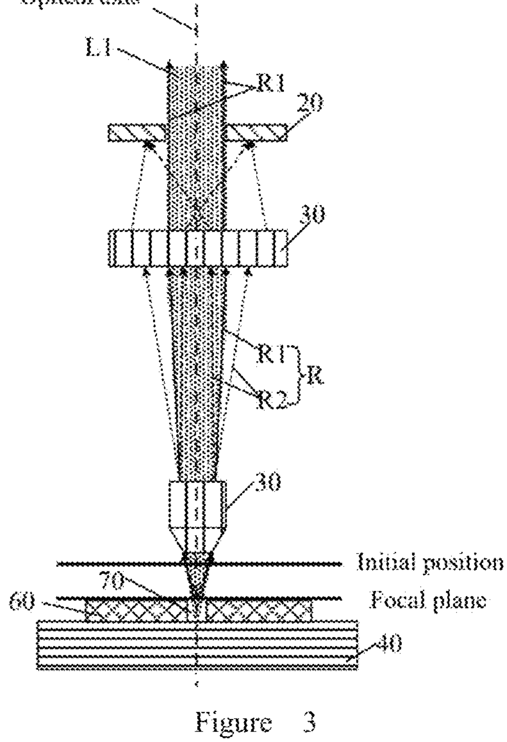
Figure 3

NON-DESTRUCTIVE IN-SITU MEASUREMENT DEVICE AND METHOD FOR HIGH-COMPLEXITY STRUCTURES BASED ON RAMAN ANALYSIS

CROSS-REFERENCE TO RELATED APPLICATIONS

This application is a continuation of International Application PCT/CN2023/084821, filed Mar. 29, 2023, which claims priority to China Patent Application No. 202210373807.4, filed Apr. 7, 2022, and China Patent Application No. 202210321961.7, filed Mar. 30, 2022. The above-referenced priority documents are incorporated herein by reference.

TECHNICAL FIELD

The present disclosure relates to the field of measurement technology, and more particularly to a non-destructive in-situ measurement device and method for high-complexity structures based on Raman analysis.

BACKGROUND

With the advancements in integrated circuits, micro-electromechanical systems (MEMS), and 3D printing manufacturing technologies, high-complexity microstructures have found widespread application, leading to increasing demands for measurement techniques tailored to these structures. The development of advanced 3D packaging processes and 3D NAND memory has introduced more complex three-dimensional chip structures, posing greater challenges for detecting the morphology, composition, and defects in three-dimensional structures during the manufacturing process.

In current technologies for measuring micro- and nano-structures, surface techniques such as profilometers and atomic force microscopes (AFM) have limited applicability for measuring high-complexity structures. Scanning electron microscopy (SEM) provides high measurement precision and is one of the commonly used methods for characterizing complex structures and compositions in the semiconductor industry. However, SEM requires the sample to be cross-sectioned layer by layer, causing significant destruction and preventing in-situ and non-destructive analysis.

U.S. Patent US20160161730A1 discloses a measurement technique based on optical interference, which measures the optical path difference of reflected light from the surface and bottom of deep hole structures in air to determine the depth of the hole. However, the white light or near-infrared beam used in this technique is easily blocked and modulated by the sidewalls of high-complexity structures, leading to low resolution, and it cannot provide information about the material's composition, stress, or other properties. To enhance structural analysis and manufacturing monitoring technologies, there remains a need for fast, convenient, non-destructive, in-situ methods for measuring high-complexity structures and their characteristics.

BRIEF DESCRIPTION OF THE DRAWINGS

The figures included in the specification and forming part of the specification illustrate exemplary embodiments, features, and aspects of the present disclosure, and are used to explain the principles of the disclosure.

FIGS. 1 and 2 illustrate schematic diagrams of the structure of a Raman-based non-destructive in-situ measurement device for high-complexity structures, according to one embodiment of the present disclosure.

FIG. 3 illustrates a schematic diagram of the optical path of a Raman-based non-destructive in-situ measurement device for high-complexity structures, according to one embodiment of the present disclosure.

DETAILED DESCRIPTION

Figure 4:
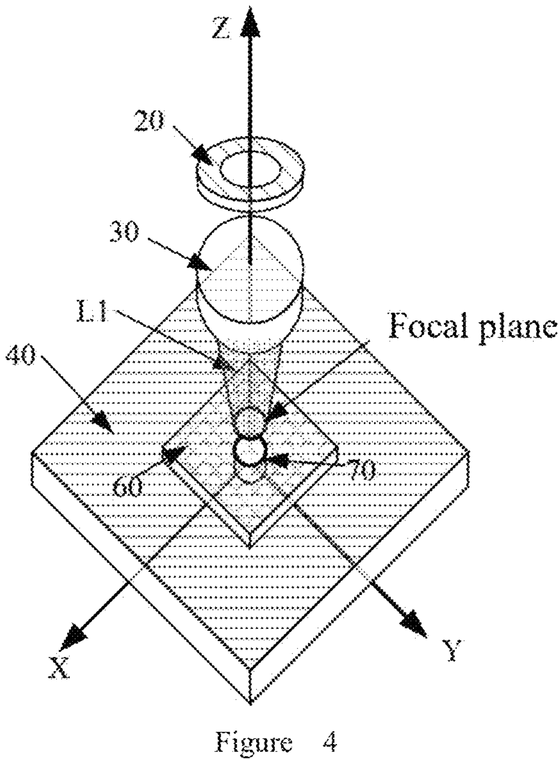
FIG. 4 illustrates a three-dimensional schematic diagram of the structure of a Raman-based non-destructive in-situ measurement device for high-complexity structures, according to one embodiment of the present disclosure.

In view of the foregoing, this disclosure presents a non-destructive, in-situ measurement device and method for high-complexity structures based on Raman analysis.

According to one aspect of this disclosure, a non-destructive, in-situ measurement device for high-complexity structures based on Raman analysis is provided. This device is used to measure structural parameters of a structure in a sample to be tested and includes the following components: a laser light source, a focusing component, a movable sample stage, and a detection module.

The laser light source emits a laser beam.

The focusing component converges the laser beam to focus it above the movable sample stage and ensures that the focal plane of the focusing component is at an initial position. During the measurement process, the focal plane is controlled to move from the initial position to at least the bottom surface of the structure to be measured.

The movable sample stage holds the sample and can move in a plane that is either perpendicular or parallel to the optical axis of the focusing component. The axial direction of the structure to be tested is parallel to the optical axis, and the structure is positioned within the focus area of the laser beam.

The detection module collects specific Raman scattering signals returned by the sample after scattering the laser beam and determines the structural parameters of the structure based on the collected results.

In one possible implementation, the device also includes:

An adjustable aperture to block part of the Raman scattering signal so that only the signal corresponding to the focus area enters the detection module.

In another possible implementation, the focusing component includes an adjustable focusing component that adjusts its focal length during the measurement process, allowing the focal plane to move from the initial position to at least the bottom surface of the structure to be tested.

component that can move along a first direction, either away from or towards the movable sample stage. The first direction is parallel to the optical axis. During the measurement, the movable focusing component moves closer to the movable sample stage, allowing the focal plane to move from the initial position to at least the bottom surface of the structure. The movable focusing component may also include an optical microscope, where the optical axis of the microscope corresponds to the optical axis of the focusing component.

The structural parameters may include one or more of the following: the depth of the structure, surface roughness, sidewall roughness, inner diameter variation, elemental distribution, defect distribution, stress distribution, and surface crystallinity.

In another possible implementation, determining the structural parameters based on the collected results includes:

Determining a scan curve corresponding to the focal plane based on the signal intensity of each collected result and the first distance the focal plane moves towards the movable sample stage.

Identifying multiple characteristic points on the scan curve and the corresponding first distances for each characteristic point.

Determining the structural parameters of the structure based on the Raman scattering model corresponding to the structure and/or the reference sample database, the characteristic points, and the first distances.

The Raman scattering model is created based on the reflection and/or scattering behavior of the structure that matches the structure being measured, and the reference sample database contains parameters determined according to similar reflection and/or scattering behaviors of the laser beam.

In one possible implementation, the structural parameters of the structure to be measured are determined based on the Raman scattering model corresponding to the structure to be measured and/or the reference sample database, the various characteristic points, and the corresponding first distance. This includes determining the extreme maximum point of the bottom surface and the extreme minimum point of the top surface among the multiple characteristic points based on the Raman scattering model and/or reference sample database corresponding to the structure to be measured. The depth of the structure to be measured is then determined based on the first distance corresponding to the extreme maximum point of the bottom surface and the extreme minimum point of the top surface In one possible implementation, determining the structural parameters of the structure to be measured based on the collected results also includes at least one of the following:

- Determining the surface roughness and/or sidewall roughness of the structure to be measured based on the local strength of the collected signal;
- Determining the elemental distribution of the structure to be measured based on the type of collected signal;
- Determining one or more of the defect distributions, stress distribution, and surface crystallinity of the structure to be measured based on the signal range, relative strength, and offset of the collected results.

According to another aspect of this disclosure, a method for non-destructive, in-situ measurement of high-complexity structures based on Raman analysis is provided, which applies to the aforementioned measurement device. The method includes the following steps:

Fixing the sample onto the movable sample stage such that the axial direction of the structure to be tested is parallel to the optical axis of the focusing component.

Controlling the laser light source to emit a laser beam towards the sample.

Controlling the focusing component such that the focal plane is initially positioned above the movable sample stage.

Moving the movable sample stage in a plane perpendicular to the optical axis so that the structure to be tested aligns with the focus area of the laser beam.

During the measurement, controlling the focal plane to move from the initial position to the bottom surface of the structure.

Using the detection module to collect the Raman scattering signal returned from the structure and determining the structural parameters based on the collected data.

In one possible implementation, the method further includes: adjusting the aperture to block signals in the Raman scattering signal that do not correspond to the focused region, such that the Raman scattering signal corresponding to the focused region is directed to the detection module.

In another implementation, after measuring the current structure, the method includes moving the movable sample stage to position the next structure in the focus area of the laser beam for subsequent measurements.

The structural parameters may include, but are not limited to, depth, surface roughness, sidewall roughness, inner diameter variation, elemental distribution, defect distribution, stress distribution, and surface crystallinity.

In one possible implementation, the structural parameters of the structure to be measured are determined based on the collected results, including:

- Determining a scanning curve corresponding to the focal plane based on the signal intensity of each collected result and the first distance corresponding to the movement of the movable stage towards the focal plane;
- Identifying multiple characteristic points in the scanning curve and determining the first distance corresponding to each characteristic point;
- Determining the structural parameters of the structure to be measured based on the Raman scattering model corresponding to the structure to be measured and/or the reference sample database, the characteristic points, and the corresponding first distance;
- Wherein the Raman scattering model is created based on the reflection and/or scattering Raman signal patterns of the laser beam on a structure matching the structure to be measured; the parameters in the reference sample database are determined based on the reflection and/or scattering Raman signal patterns of the laser beam on a structure matching the structure to be measured.

In one possible implementation, the structural parameters of the structure to be measured are determined based on the Raman scattering model corresponding to the structure to be measured and/or the reference sample database, the characteristic points, and the corresponding first distance, including:

Determining the bottom surface maximum point and the top surface minimum point among the multiple characteristic points based on the Raman scattering model corresponding to the structure to be measured and/or the reference sample database;

Determining the depth of the structure to be measured based on the first distances corresponding to the bottom surface maximum point and the top surface minimum point.

In one possible implementation, the structural parameters of the structure to be measured are determined based on the collected results, further including at least one of the following:

Determining the surface roughness and/or sidewall roughness of the structure to be measured based on the local signal strength of the collected results;

Determining the elemental distribution of the structure to be measured based on the type of collected signals;

Determining one or more of the defect distribution, stress distribution, and surface crystallinity of the structure to be measured based on the signal range, relative strength, and offset of the collected results.

This disclosure provides a Raman-based non-destructive in-situ measurement device and method for high-complexity structures, enabling rapid, non-destructive, and precise measurements of structural parameters, composition, defects, and stress for wafer-level high-complexity periodic structure arrays using micro-Raman analysis. This facilitates rapid, non-destructive, in-situ, efficient, and low-cost assessment of processing quality and microstructural characteristics, providing a basis for improving process yield, optimizing process conditions, and offering structural analysis and manufacturing monitoring support.

Other features and aspects of this disclosure will become clear through the following detailed description of exemplary implementations, with reference to the accompanying drawings.

DETAILED DESCRIPTION OF EMBODIMENTS

The various exemplary embodiments, features, and aspects of the present disclosure will be described in detail below with reference to the accompanying drawings. In the drawings, the same reference numerals represent elements with the same or similar functions. Although various aspects of the embodiments are illustrated in the drawings, unless specifically indicated, the drawings are not necessarily drawn to scale.

The term "exemplary" as used herein means "serving as an example, embodiment, or illustration." Any embodiment described as "exemplary" is not to be interpreted as being superior to or better than other embodiments.

Furthermore, to better illustrate the present disclosure, numerous specific details are provided in the following detailed description of the embodiments. It should be understood by those skilled in the art that the present disclosure can also be implemented without certain specific details. In some instances, methods, means, elements, and circuits well known to those skilled in the art are not described in detail to better highlight the essence of the present disclosure.

To address the technical issues present in related technologies, the embodiments of the present disclosure provide a non-destructive in-situ measurement device and method for high-complexity structures based on Raman analysis. This allows for rapid, non-destructive, and precise measurement of the structural parameters of wafer-level high-complexity structure periodic arrays. It facilitates efficient, low-cost, non-destructive in-situ evaluation of processing quality and microstructural features, providing a basis for improving process yield, optimizing process conditions, and supporting structural analysis and manufacturing monitoring.

FIGS. 1 and 2 illustrate a schematic diagram of the structure of a non-destructive in-situ measurement device for high-complexity structures based on Raman analysis, according to one embodiment of the present disclosure. As shown in FIG. 1, the device includes: a laser light source 10, a focusing component 30, a movable sample stage 40, and a detection module 50. This device is used for measuring structural parameters of high-complexity microstructures, such as a test structure 70 on a sample 60 to be tested. The high-complexity microstructure can be a pore structure with an aspect ratio exceeding 5:1, and the depth of the high-complexity microstructure can be less than or equal to 1 micron. For example, the test structure can be a wafer-level high-complexity silicon through-hole, with an aspect ratio of 5:1, 20:1, or 100:1.

The laser light source 10 is used to emit a laser beam L1.

The focusing component 30 is used to converge the laser beam L1 and focus it above the movable sample stage 40, with the focal plane of the focusing component 30 initially positioned at an initial position. During the measurement process, the focal plane is controlled to move from the initial position to at least the bottom of the test structure 70.

The movable sample stage 40 is used to support the sample 60 to be tested. It can move in a plane perpendicular and/or parallel to the optical axis of the focusing component, with the axial direction of the test structure 70 in the sample 60 being parallel to the optical axis, and the test structure 70 being positioned in the focal region of the laser beam.

The detection module 50 is used to collect the specific Raman scattering signals R that are returned after being scattered by the test structure 70 from the laser beam L1, and based on the collected results, determine the structural parameters of the test structure 70.

In this embodiment, the structural parameters may include parameters that indicate the structural characteristics of the test structure. The structural parameters may include at least one of the following: the depth of the test structure, the surface roughness of the test structure, the sidewall roughness of the test structure, the variation rate of the inner diameter of the test structure, the element distribution of the test structure, the defect distribution of the test structure, the stress distribution of the test structure, and the surface crystallinity of the test structure. A person skilled in the art can set the structural parameters as needed, and this disclosure imposes no limitations in this regard.

In this embodiment, the detection module 50 can be synchronized with the laser light source 10 to ensure that the detection module 50 can promptly acquire the Raman scattering signals, avoiding failure to capture the Raman scattering signals when the focal plane is at the initial position due to reasons such as delayed activation of the detection module 50 or errors before the measurement begins, such as the focal plane already being between the initial position and the movable sample stage.

In this embodiment, the detection module 50 is also used to collect, or based on the records of the focusing component 30, determine the first distance by which the focal plane corresponding to each collected Raman scattering signal R moves closer to the movable sample stage, or the distance between the focal plane corresponding to each Raman scattering signal R and the movable sample stage. This ensures that the structural parameters of the test structure 70 can be determined based on the collected results and the first distance corresponding to each collected result.

In this embodiment, the structural parameters of the test structure 70 can be determined by the detection module through analysis or by other processors based on the collected results and the first distance corresponding to each collected result. This disclosure imposes no limitations in this regard.

In this embodiment, the detection range of the Raman scattering signals collected by the detection module can be set based on the material of the test structure. The movement detection range of the first distance of the focal plane can be set based on the estimated or designed depth of the test structure, ensuring that the movement detection range exceeds the target depth h. To ensure that the specific Raman scattering signals corresponding to both the top and bottom surfaces of the test structure are captured, the movement detection range can be 2 h. If the surface of the movable sample stage is set as the point where the focal plane movement distance is zero, the movement detection range could be, for example, [−0.5 h, 1.5 h], [−1.5 h, 1.5 h], etc. The wavelength of the laser beam emitted by the laser light source can be set based on the measurement needs of the test structure. For instance, if the test structure is a silicon through-hole with a depth of approximately 100 μm, the wavelength of the laser beam can be set to 532 nm, the detection range for the Raman scattering signals can be set to a Raman Shift of 500 cm-1~550 cm-1, and the movement detection range can be set to −250 μm~+250 μm. It is understood that a person skilled in the art can set the detection range, movement detection range, and wavelength of the laser beam based on measurement needs, and this disclosure imposes no limitations in this regard.

In one possible implementation, as shown in FIG. 2, the device may further include an adjustable aperture 20 for blocking part of the Raman scattering signals R, so that the signals R1 corresponding to the focal region are directed to the detection module 50.

FIG. 3 illustrates a schematic diagram of the optical path of a non-destructive in-situ measurement device for high-complexity structures based on Raman analysis, according to one embodiment of the present disclosure. In this implementation, as shown in FIG. 3, the part R1 of the Raman scattering signal R can pass through the focusing component 30 and the aperture of the adjustable aperture 20 before entering the detection module 50. Meanwhile, another part R2 of the Raman scattering signal R passes through the focusing component 30 but is blocked by the adjustable aperture 20, preventing it from entering the detection module 50. The adjustable aperture 20 is located in the optical path between the detection module 50 and the focusing component 30. The adjustable aperture can be an adjustable confocal pinhole aperture, and its aperture size can be adjusted as needed. Generally, for smaller feature sizes of the structure to be measured, a smaller aperture size is used to improve measurement accuracy. This disclosure imposes no limitations on this. By setting the adjustable aperture 20, the device's spatial resolution along the optical axis can be improved.

In one possible implementation, the focusing component 30 may include an adjustable focusing component with an adjustable focal length. During the measurement process, the adjustable focusing component adjusts its focal length, allowing the focal plane to move from the initial position to at least the bottom of the test structure. The adjustable focusing component or the detection module can determine the first distance that the focal plane moves based on the focal length change. In this way, the position of the focal plane can be adjusted through the adjustable focusing component, enabling the measurement of the test structure.

In another possible implementation, the focusing component 30 includes a movable focusing component, which can move along a first direction away from or closer to the movable sample stage 40, with the first direction being parallel to the optical axis. During the measurement, the movable focusing component moves closer to the movable sample stage 40 along the first direction, so that the movable focal plane moves from the initial position to at least the bottom of the test structure 70.

In this implementation, the movable focusing component may include an optical microscope, where the optical axis of the microscope objective lens aligns with the optical axis of the optical path. The magnification of the objective lens can be set based on the measurement needs of the test structure. For example, if the test structure is a silicon through-hole, the objective lens magnification may be set to 10×. It is understood that a person skilled in the art can set the magnification of the objective lens according to measurement needs, and this disclosure imposes no limitations on this.

In this implementation, FIG. 4 shows a stereoscopic structural diagram of a non-destructive in-situ measurement device for high-complexity structures based on Raman analysis, according to one embodiment of the present disclosure. As shown in FIG. 4, the focus area of the laser beam L1 refers to the area on the surface of the test sample where the laser beam L1 is irradiated. The closer the size of the focus area is to the size of the test structure 70, the more accurate the measurement results of the structural parameters of the test structure will be.

Figure 5:
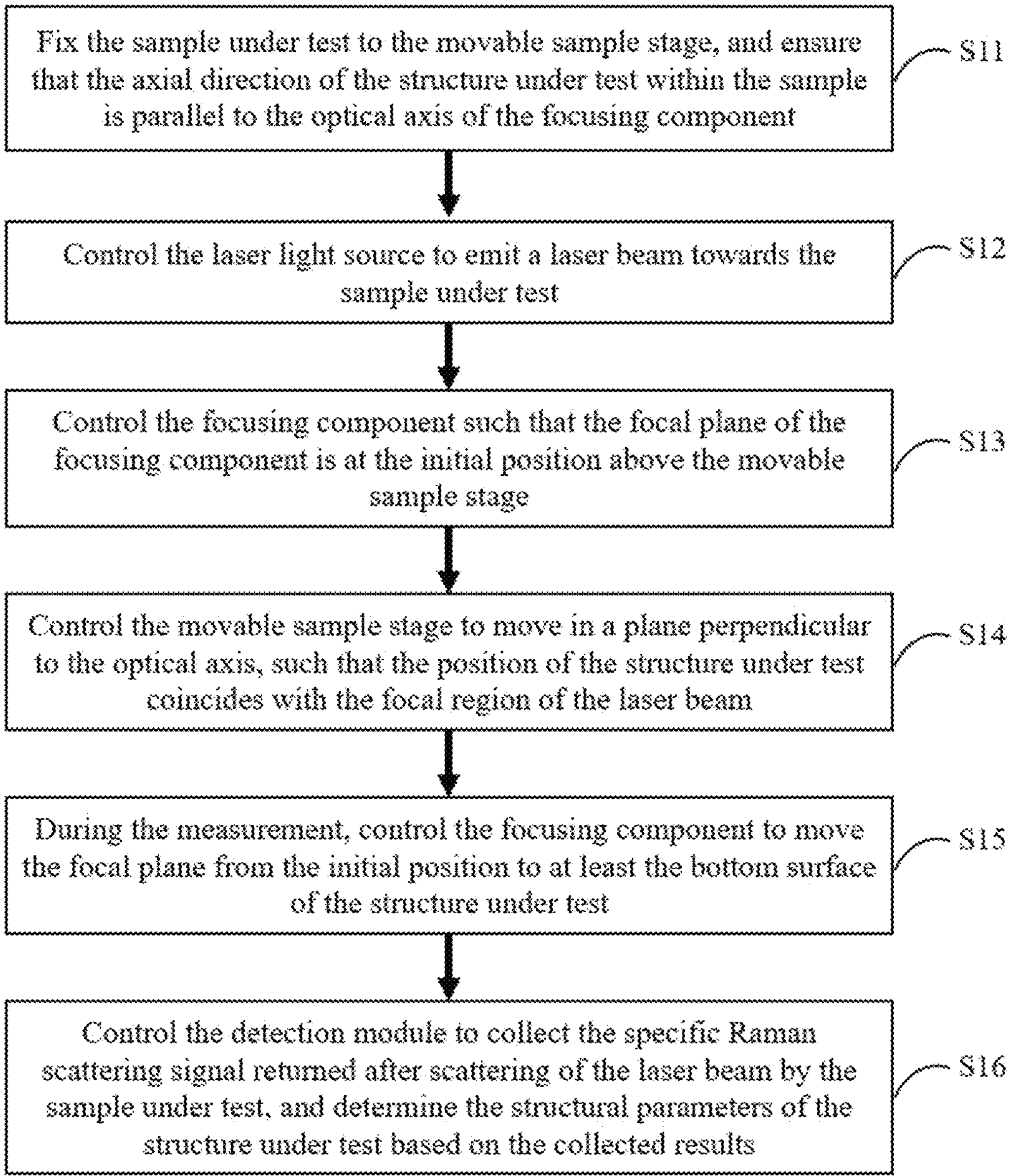
FIG. 5 illustrates a flowchart of a measurement method for high-complexity structures using Raman-based non-destructive in-situ analysis, according to one embodiment of the present disclosure.

FIG. 5 illustrates a flowchart of the measurement method for non-destructive in-situ high-complexity structures based on Raman analysis, according to one embodiment of the present disclosure. As shown in FIG. 5, the method includes steps S11 to S16. This method employs the non-destructive in-situ measurement device based on Raman analysis provided in the embodiment to perform measurements on the structure to be tested. The following describes the method provided in the embodiment with reference to FIGS. 1 to 5.

In step S11, the sample 60 to be tested is fixed on the movable stage 40, ensuring that the axial direction of the structure 70 to be measured in the sample 60 is parallel to the optical axis Z of the focusing component 30.

In step S12, the laser source 10 is controlled to emit a laser beam L1 towards the sample 60 to be tested.

In step S13, the focusing component 30 is controlled so that its focal plane is positioned at the initial position above the movable stage 40.

In this embodiment, as shown in FIG. 4, the focal plane of the focusing component 30 can be adjusted to move away from or towards the movable stage 40 along the optical axis Z or in a direction parallel to it. If the focusing component is an adjustable focusing component, the position of the focal plane can be adjusted directly by changing the focal length of the adjustable focusing component. If the focusing component is an optical microscope (i.e., a movable focusing component), the adjustment can involve either "adjusting the object distance of the optical microscope itself" or "moving the optical microscope as a whole to bring the objective lens closer to or further from the movable stage 40" to achieve the desired initial position of the focal plane of the laser beam L1.

In step S14, the movable stage 40 is controlled to move in a plane perpendicular to the optical axis Z, so that the position of the structure 70 to be measured coincides with the focused area of the laser beam L1.

In this embodiment, as shown in FIG. 4, the movable stage 40 can translate in the XY plane (i.e., the plane perpendicular to the optical axis Z), thus altering the relative position between the structure 70 to be measured and the focused area of the laser beam L1.

In one possible implementation, if the device includes an adjustable aperture 20, before executing step S15, the method may also include adjusting the aperture size of the adjustable aperture 20 to block signals R2 in the Raman scattering signal R except for those corresponding to the focused area (signal R1), so that the Raman scattering signal R1 corresponding to the focused area is incident on the detection module 50.

In step S15, during the measurement process, the focusing component 30 is controlled to move the focal plane from the initial position to at least the bottom surface of the structure 70 to be measured.

In step S16, the detection module 50 is controlled to collect the Raman scattering signals scattered back from the sample 60 to be tested after receiving the laser beam L1 during the measurement process and to determine the structural parameters of the structure 70 to be measured based on the collected measurement results.

In one possible implementation, the collected results may include the signal intensity of the Raman scattering signals. In this case, step S16 performed by the detection module 50 may include: determining a scan curve corresponding to the focal plane based on the signal intensity of each collected result and the first distance that the focal plane moves towards the movable stage; identifying multiple characteristic points on the scan curve and the first distance corresponding to each characteristic point; and determining the structural parameters of the structure to be measured based on the Raman scattering model corresponding to the structure and/or the reference sample database, each characteristic point, and their corresponding first distance.

Here, the Raman scattering model is created based on the reflection and/or scattering Raman signal patterns of the laser beam from a structure that matches the structure to be measured. The parameters in the reference sample database are determined based on the reflection and/or scattering Raman signal patterns of the laser beam from a structure that matches the structure to be measured.

In one possible implementation, before identifying multiple characteristic points on the scan curve and the first distance corresponding to each characteristic point, the scan curve may first be preprocessed. The preprocessing may include at least one of smoothing or fitting. This can improve the accuracy of the determined structural parameters.

In this implementation, different types of structures (i.e., structures) can be simulated based on predicted reflection and/or scattering Raman signal patterns of the laser beam. This simulation can yield Raman scattering models for different types of structures, which can help determine structural parameters based on these models and the actual scan curves generated. Alternatively, parameters for predicted scan curves of different types of structures can be computed based on predicted reflection and/or scattering Raman signal patterns of the laser beam, establishing a reference sample database. Structural parameters can then be determined directly by comparing the actual scan curve with the parameters recorded in the reference sample database.

In one possible implementation, determining the structural parameters of the structure to be measured based on the Raman scattering model corresponding to the structure and/or the reference sample database, each characteristic point, and the corresponding first distance may include:

Determining the bottom surface maximum point and top surface minimum point among the multiple characteristic points according to the Raman scattering model corresponding to the structure and/or the reference sample database. Then, based on the first distances corresponding to the bottom surface maximum point and the top surface minimum point, the depth of the structure to be measured is determined.

Figures 6, 7A, 7B, 7C:
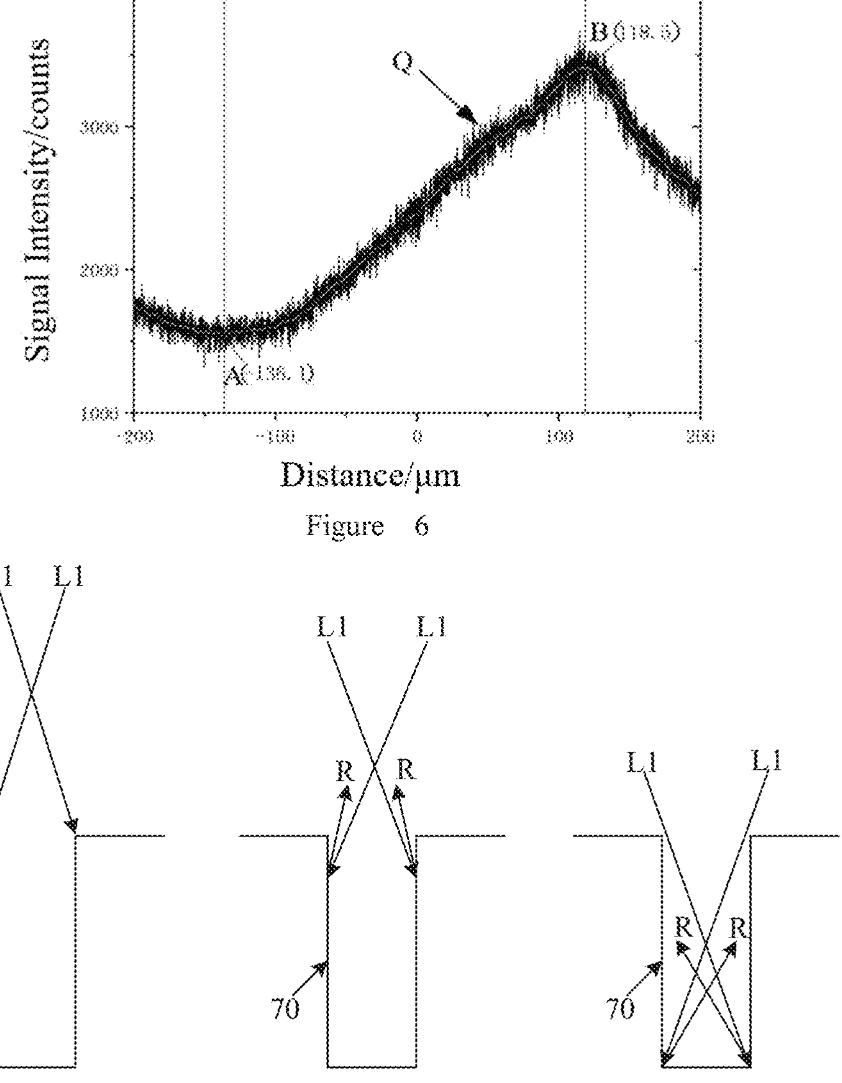
FIG. 6 illustrates a schematic diagram of the scanning curve in the measurement method for high-complexity structures using Raman-based non-destructive in-situ analysis, according to one embodiment of the present disclosure.
FIGS. 7A-7C illustrate schematic diagrams of the measurement process for high-complexity structures using Raman-based non-destructive in-situ analysis, according to one embodiment of the present disclosure.

For example, FIG. 6 illustrates a schematic of a scan curve in the measurement method based on Raman analysis of high-complexity structures according to an embodiment of the present disclosure. The detection module 50 can determine a scan curve Q corresponding to the focal plane based on the signal intensity of each Raman scattering signal and the detected (or recorded by the focusing component) first distance of the focal plane movement, as shown in FIG. 6. Then, based on the corresponding Raman scattering model and/or the reference sample database, the bottom surface maximum point B and top surface minimum point A in the scan curve Q are identified, along with their corresponding moving distances S1=−136.1 and S2=118.5, respectively. The depth of the structure to be measured 70 can be determined as $H=|S2-S1|=|118.5-(-136.1)|=254.6$ μm.

FIGS. 7A-7C illustrate the measurement process of high-complexity structures based on Raman analysis according to an embodiment of the present disclosure. To explain the measurement process of the structure to be measured, the following description is based on FIGS. 7A-7C. The laser beam L1 is focused by the focusing component 30 during the movement of the focal plane. As shown in FIG. 7A, when the focal plane approaches the upper surface of the sample to be measured 60 and the size of the laser beam L1 spot projected on the upper surface (i.e., the focusing area) matches the size of the structure to be measured 70, the entire laser beam L1 enters the structure to be measured 70. The Raman scattering signals from the region of the upper surface of the sample 60 corresponding to the structure to be measured 70 gradually decrease and disappear, resulting in the top surface minimum point A on the scan curve as shown in FIG. 6. As shown in FIG. 7B, as the focal plane continues to descend until the laser beam L1 re-illuminates the surface of the sidewall of the structure to be measured 70, the signal intensity of the reflected light and Raman scattering signals increases. As shown in FIG. 7C, when the focal plane approaches the bottom surface of the structure to be measured 70, the entire laser beam L1 illuminates the bottom surface of the structure to be measured 70, resulting in the bottom surface maximum point B on the scan curve. The difference in distance between the bottom surface maximum point B and the top surface minimum point A is the depth of the structure to be measured 70.

In this embodiment, if the sample to be measured includes multiple structures to be measured, an array scanning method can be used to measure some or all of the structures to be measured. The array scanning includes: after completing the measurement of one structure to be measured according to the measurement process shown in FIGS. 7A-7C, adjusting the relative position of the movable stage 40 and the focusing component 30 in the plane perpendicular to the optical axis, and controlling the focusing component 30 to move the focal plane away from the movable stage 40, so that the focal plane of the laser beam L1 returns to the initial position and the focusing area reaches the position of the next structure to be measured. This process is repeated until all the structures to be measured have been measured.

In this embodiment, if the sample to be measured includes multiple structures, measurements can be performed on some or all of the structures as needed. Measuring some of the structures can involve interval measurements among multiple structures, meaning that after measuring the current structure to be measured, the next structure to be measured is another structure that is one structure away from the already measured structure. Measuring some of the structures can also involve measuring designated structures among multiple structures, meaning that measurements can be performed on multiple specified structures among the structures to be measured. The positions of the designated structures can be set in advance, allowing for targeted measurements. The implementation of measuring some structures among multiple structures can be adjusted based on actual needs, and the disclosure does not limit these methods.

If the sample to be measured includes multiple structures, the device can also record the movement distances of the movable stage 40 in the X and Y directions between different structures to be measured, which can then be used to determine the relative positional relationships between the multiple structures to be measured based on the X and Y movement distances.

Furthermore, if the sample to be measured includes multiple structures, after calculating the structural parameters of each structure, the device can also perform a uniformity assessment of the structural parameters based on the parameters of each structure. For example, a uniformity assessment of depth can be performed based on the depths of the structures to be measured.

For structures with periodic fluctuations on the inner wall, this method can achieve precise measurement of the wall's fluctuation using the Raman scattering model and/or reference sample database. However, for complex structures or structures with extremely high aspect ratios, the Raman scattering model and/or reference sample database can be complex. In such cases, a Raman scattering model can be established using standard samples, and high-precision fitting and accurate measurement analysis can be achieved through machine learning and other big data methods.

Figure 8:
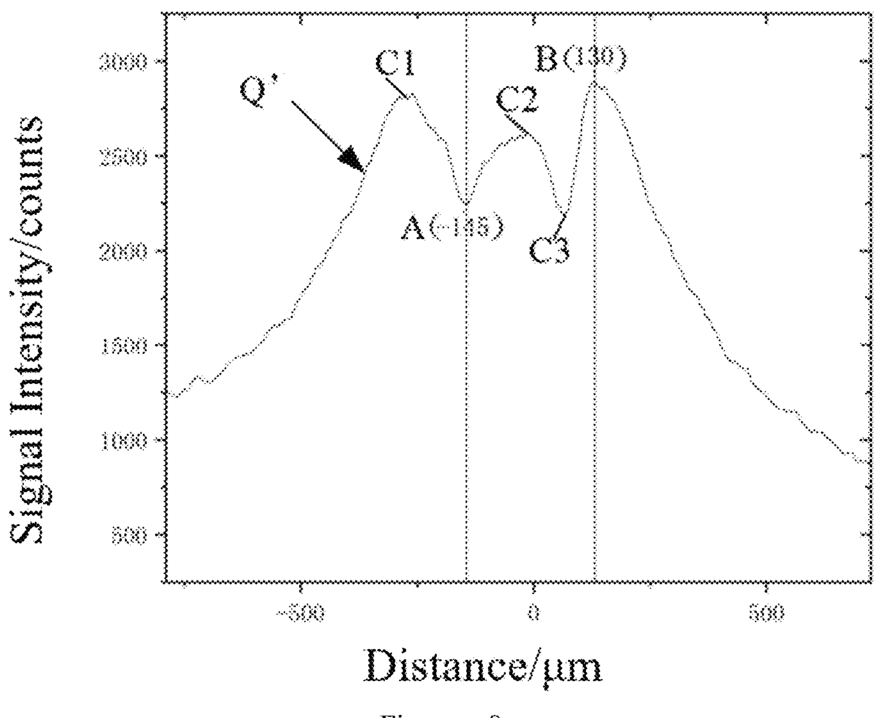
FIG. 8 illustrates a schematic diagram of the scanning curve in the measurement method for high-complexity structures using Raman-based non-destructive in-situ analysis, according to one embodiment of the present disclosure.

For example, FIG. 8 illustrates a schematic of the scanning curve in the non-destructive, in-situ measurement method for high-complexity structures based on Raman analysis according to an embodiment of this disclosure. As shown in FIG. 8, if the aspect ratio of the structure to be measured is approximately 10:1, and a scanning curve Q' is obtained as shown in the figure, the structural parameters can be determined based on the Raman scattering model and/or reference sample database, as well as the feature points and their corresponding first distances. For instance, if the bottom surface maximum value point B and the top surface minimum value point A on the scanning curve Q' correspond to the top and bottom surfaces of the structure to be measured, then given the first distances S1=−145 μm and S2=130 μm, the depth H of the structure to be measured 70 can be determined as H=|S2−S1|=|130−(−145)|=275 μm. Additionally, combining C1, C2, and C3 can further determine other structural parameters of the structure to be measured.

Figure 9:
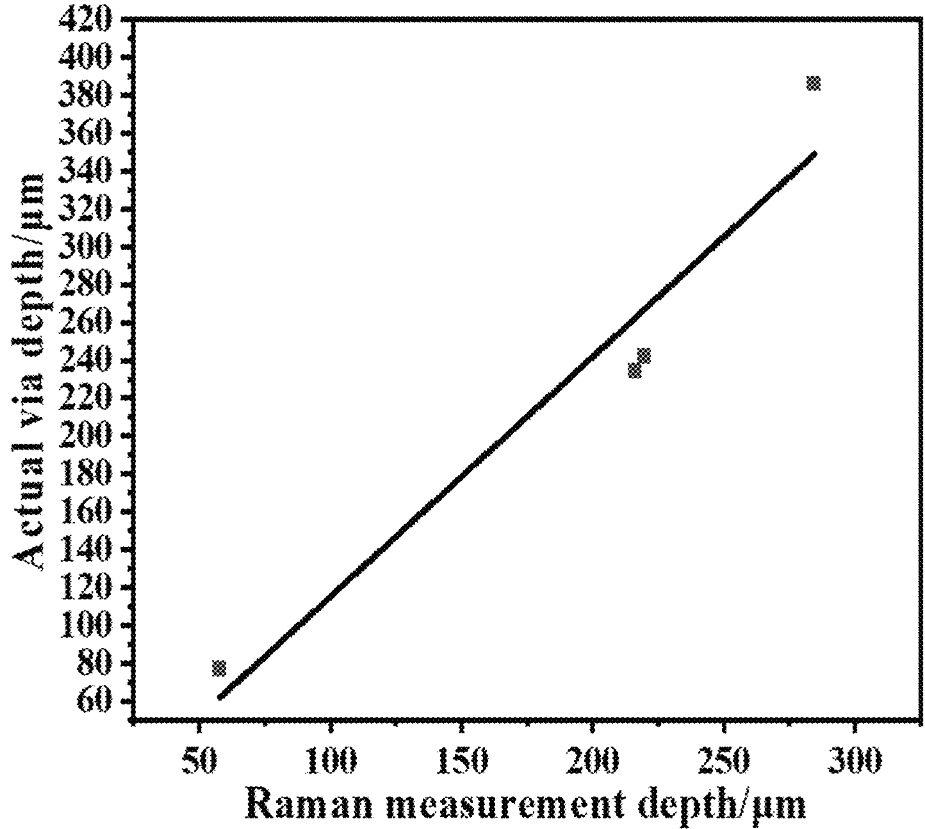
FIG. 9 illustrates a fitted curve of the actual structure depth and the Raman measurement values in the measurement method for high-complexity structures using Raman-based non-destructive in-situ analysis, according to one embodiment of the present disclosure.

This disclosure further shows an analytical method for converting the relationship between the depth of the structure to be measured and the Raman analysis measurement values during the non-destructive, in-situ measurement of high-complexity structures. After measuring multiple standard structure samples with different depths (with known composition, structural morphology, and geometric dimensions, i.e., known structural parameters), the obtained Raman measurement values can be fitted with the standard structure depths to derive a conversion relationship between measurement values and standard structure dimensions. An embodiment of this disclosure illustrates a measurement example of the conversion relationship between actual standard structures and Raman analysis measurement values during non-destructive measurement of high-complexity structures. After performing Raman measurements on several standard structures with known morphologies ranging from 80 μm to approximately 400 μm, the Raman analysis values (x) obtained from the collected results are fitted with the actual known structure depths (y) to obtain the conversion formula: Actual known structure depth y=Raman analysis value x*1.27−11.55 (μm). The linear fitting graph is shown in FIG. 9. For the analysis and measurement data of similar complex structures, this method can optimize the fitting results further through big data reinforcement learning, improving analysis accuracy and computational efficiency, with fitting times on the scale of 1 microsecond to a few microseconds. In practical applications, this method can achieve ultra-fast non-destructive in-situ measurements within microseconds.

In one possible implementation, determining the structural parameters of the structure to be measured based on the collected results can also include: determining the surface fluctuations and/or sidewall fluctuations of the structure to be measured based on the local strength of the collected signal.

For instance, the detection module 50 can determine the scanning curve Q corresponding to the focal plane in terms of the first distance and signal intensity, as shown in FIG. 6, based on the signal intensity of each Raman scattering signal and the detected (or recorded by the focusing component) first distance of the focal plane movement. Then, analyzing the minor peak distances in the curve can provide information about the surface fluctuations of the sample.

In one possible implementation, determining the structural parameters of the structure to be measured based on the collected results may also include: determining the elemental distribution of the structure to be measured based on the type of signal from the collected results, and/or determining one or more of the defect distribution, stress distribution, and surface crystallinity of the structure to be measured based on the signal range, relative strength, and offset from the collected results.

Figure 10:
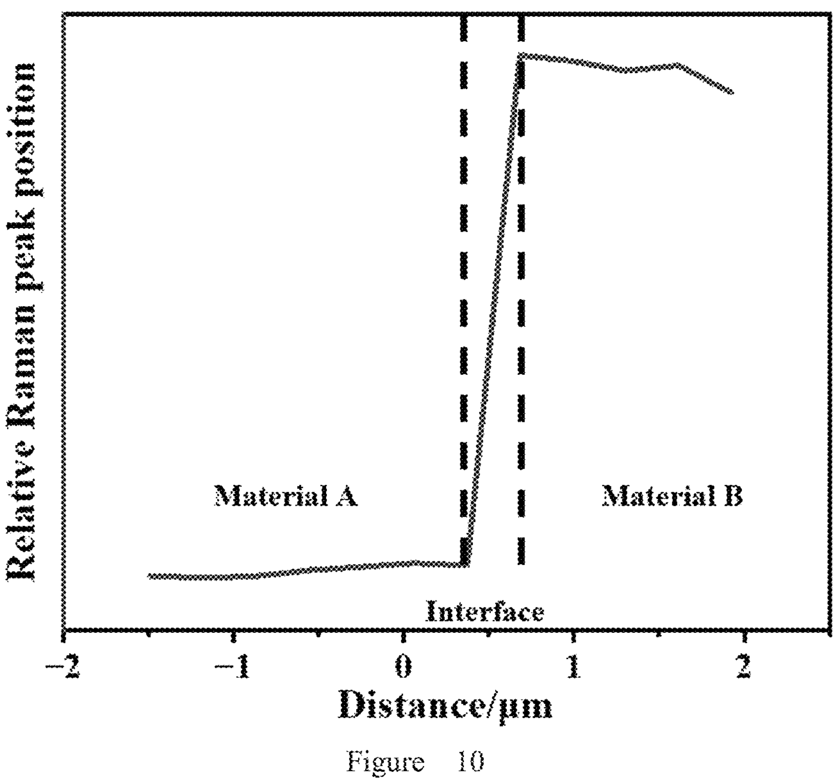
FIG. 10 illustrates a schematic diagram of the scanning curve in the composition analysis method for high-complexity structures using Raman-based non-destructive in-situ analysis, according to one embodiment of the present disclosure.

For example, as shown in FIG. 10, the detection module 50 can determine a scanning curve corresponding to the focal plane in terms of the first distance and relative peak position, as shown in FIG. 10, based on the signal peak position of each Raman scattering signal and the detected (or recorded by the focusing component) first distance of the focal plane movement. Then, based on the Raman scattering signal characteristics of the corresponding components and/or the reference sample database, different characteristic peak positions in the scanning curve can be identified to correspond to material components, and the distribution of these materials along the first distance can be obtained. Similarly, by changing the analysis from signal peak positions to the analysis of the signal's full width at half maximum (FWHM), the surface crystallinity and defect distribution of the structure can be analyzed. By changing the analysis from signal peak positions to the analysis of the signal's offset relative to standard material peaks of known surface materials, the surface stress distribution of the structure can be analyzed.

It should be noted that, although the above implementation examples describe the measurement device and method for non-destructive in-situ high-complexity structures based on Raman analysis, those skilled in the art will understand that the disclosure is not limited to these examples. In fact, users can flexibly set various modules and steps according to their preferences and/or actual application scenarios, as long as they conform to the technical solutions of the disclosure.

In some embodiments, the functionalities or modules of the device provided in this disclosure can be used to perform the methods described in the above implementation examples. The specific implementation can refer to the descriptions of the above method embodiments, and for the sake of brevity, will not be repeated here.

The disclosed embodiment also presents a computer-readable storage medium, which stores computer program instructions. When executed by a processor, these instructions implement the step of determining the structural parameters of the structure to be measured based on the collected results, as described in the above method. The computer-readable storage medium can be a volatile or non-volatile computer-readable storage medium.

The disclosed embodiment further proposes an electronic device comprising: a processor; and a memory for storing instructions executable by the processor. The processor is configured to execute the instructions stored in the memory to perform the step of determining the structural parameters of the structure to be measured based on the collected results, as described in the above method.

Additionally, the disclosed embodiment provides a computer program product, including computer-readable code, or a non-volatile computer-readable storage medium carrying the computer-readable code. When the computer-readable code runs on the processor of an electronic device, the processor performs the step of determining the structural parameters of the structure to be measured based on the collected results, as described in the above method.

Figure 11:
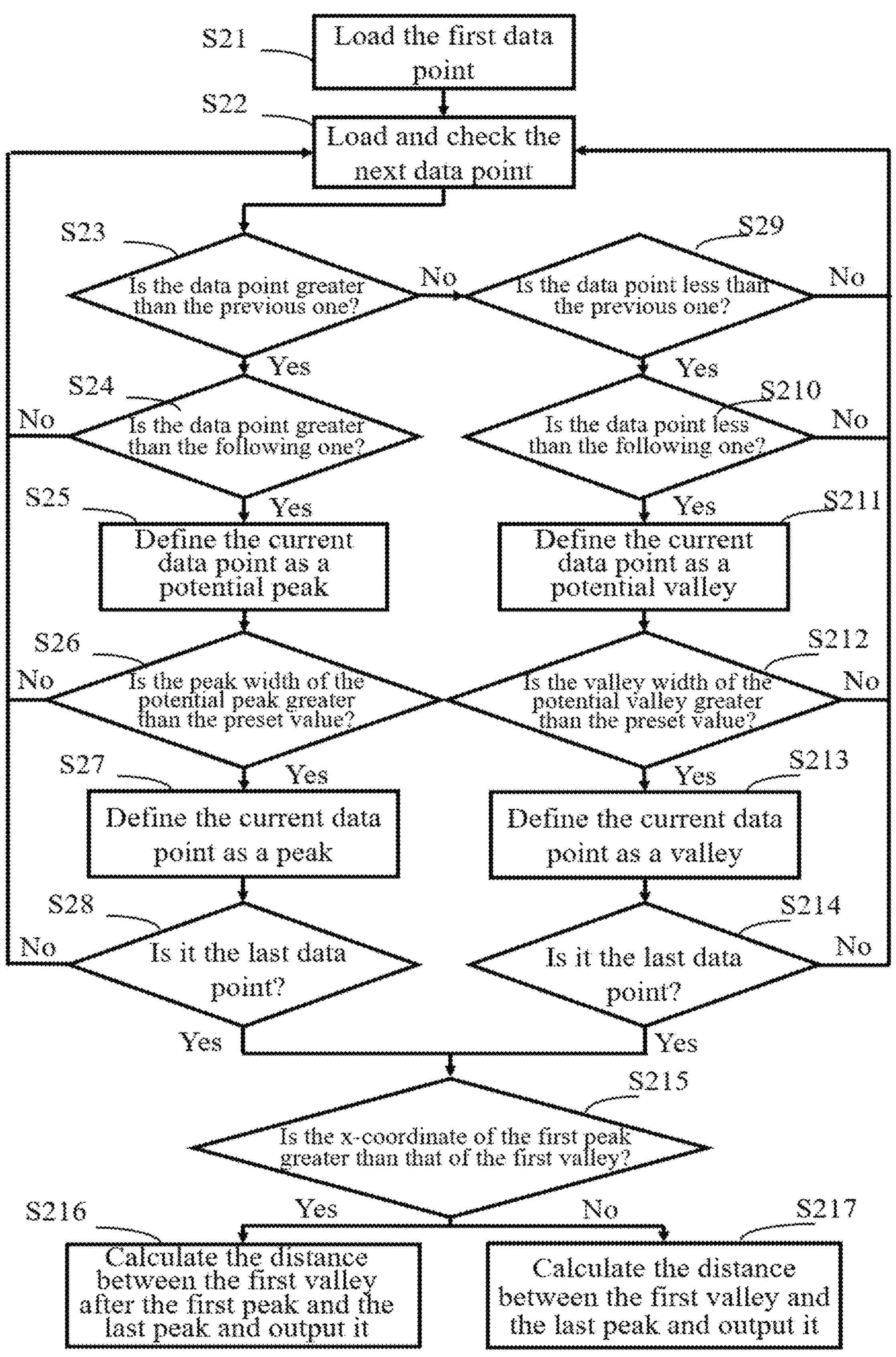
FIG. 11 illustrates a schematic diagram of the computer-readable code execution flow for analyzing the Raman collection results of high-complexity structures, according to one embodiment of the present disclosure.

The disclosed embodiment also provides an executable code flow for the Raman analysis-based non-destructive in-situ measurement method for high-complexity structures. The executable code can use the Python standard function scipy.signal.find_peaks( ) to identify peaks. As shown in FIG. 11, the execution flow includes steps S21 to S217. The following describes the computer-readable code provided by the disclosed embodiment in conjunction with FIG. 11.

In step S21, the program retrieves data from the raw document of the collected results and calls the first data point. The format of the raw document can be .csv, .txt, .xlsx, etc., and is not limited by the invention.

In step S22, the program checks the next data point and proceeds to step S23.

In step S23, the program compares the intensity of the current data point with that of the previous data point. If the intensity of the current data point is greater than that of the previous data point, the program proceeds to step S24; otherwise, it proceeds to step S29.

In step S24, the program compares the intensity of the current data point with that of the following data point. If the intensity of the current data point is greater than that of the following data point, the program proceeds to step S25; otherwise, it returns to step S22.

In step S25, the program defines the current data point as a potential peak and proceeds to step S26.

In step S26, the program compares the peak width corresponding to the potential peak data point with a preset value. If the peak width of the potential peak data point is greater than the preset value, the program proceeds to step S27; otherwise, it returns to step S22. In one possible scenario, the peak width can be the difference in x-coordinates of 10 data points.

In step S27, the potential peak data point is defined as a peak data point and proceeds to step S28.

In step S28, the program determines whether the current data point is the last data point. If it is, the program proceeds to step S215; otherwise, it returns to step S22.

In step S29, the program compares the intensity of the current data point with that of the previous data point. If the intensity of the current data point is less than that of the previous data point, the program proceeds to step S210; otherwise, it returns to step S22.

In step S210, the program compares the intensity of the current data point with that of the following data point. If the intensity of the current data point is less than that of the following data point, the program proceeds to step S211; otherwise, it returns to step S22.

In step S211, the program defines the current data point as a potential valley and proceeds to step S212.

In step S212, the program compares the valley width corresponding to the potential valley data point with a preset value. If the valley width of the potential valley data point is greater than the preset value, the program proceeds to step S213; otherwise, it returns to step S22. In one possible scenario, the valley width can be the difference in x-coordinates of 10 data points.

In step S213, the potential valley data point is defined as a valley data point and proceeds to step S214.

In step S214, the program determines whether the current data point is the last data point. If it is, the program proceeds to step S215; otherwise, it returns to step S22.

In step S215, the program checks whether the x-coordinate of the first peak is greater than that of the first valley. If it is, the program proceeds to step S216; otherwise, it proceeds to step S217.

In step S216, the program calculates the distance between the first valley and the last peak and outputs the measurement result.

In step S217, the program calculates the distance between the first valley and the last peak and outputs the measurement result.

The above describes various embodiments of the present disclosure. The descriptions are exemplary and not exhaustive, and are not limited to the disclosed embodiments. Without deviating from the scope and spirit of the described embodiments, many modifications and changes are apparent to those skilled in the art. The choice of terminology used herein is intended to best explain the principles of the embodiments, their practical applications, or technological improvements in the market, or to enable other skilled practitioners in the field to understand the disclosed embodiments.

What is claimed is:

1. A non-destructive in-situ measurement device for high-complexity structures based on Raman analysis, characterized by its use for measuring structural parameters of a structure under test within a sample under test, the device comprising:

- a laser light source, wherein the laser light source is configured to emit a laser beam;

a focusing component, wherein the focusing component is configured to converge the laser beam and focus the laser beam, above a movable sample stage and position a focal plane of the focusing component at an initial position, and during a measurement process, the focal plane is controlled to move from the initial position to at least a bottom surface of the structure under test;

the movable sample stage, wherein the movable sample stage holds the sample under test and is configured to move in a plane perpendicular and/or parallel to an optical axis of the focusing component, wherein an axis of the structure under test is parallel to the optical axis and is located within a focal region of the laser beam; and a detection module, wherein the detection module collects specific Raman scattering signals returned from the sample under test after scattering the laser beam, and the structural parameters of the structure under test are determined based on collected results, wherein the determination of the structural parameters of the structure under test based on the collected results comprises:

determining a scanning curve corresponding to the focal plane based on a signal intensity of each collected result and a first distance moved by the focal plane towards the movable sample stage;

determining multiple feature points on the scanning curve and the corresponding first distance for each feature point; and determining the structural parameters of the structure under test based on a Raman scattering model and/or a reference sample database corresponding to the structure under test, the feature points, and the corresponding first distances;

wherein the Raman scattering model is created based on reflection and/or scattering Raman signal patterns of the laser beam for a structure matching the structure under test; and wherein parameters in the reference sample database are determined based on the reflection and/or scattering Raman signal patterns of the laser beam for a structure matching the structure under test.

2. The device according to claim 1, wherein the device further comprises:

an adjustable aperture, wherein the adjustable aperture blocks part of the Raman scattering signals, so that a signal corresponding to a focal region of Raman scattering is incident on the detection module.

3. The device according to claim 1, wherein the focusing component comprises:

an adjustable focusing component with an adjustable focal length, wherein the adjustable focusing component adjusts the adjustable focal length during the measurement process, such that the focal plane moves from the initial position to at least the bottom surface of the structure under test.

4. The device according to claim 1, wherein the focusing component comprises a movable focusing component, wherein the movable focusing component is configured to move along a first direction, away from or closer to the movable sample stage, wherein the first direction is parallel to the optical axis;

during the measurement process, the movable focusing component moves closer to the movable sample stage along the first direction, such that the focal plane moves from the initial position to at least the bottom surface of the structure under test;

the movable focusing component comprises an optical microscope, wherein the optical axis is an optical axis of an objective lens in the optical microscope.

5. The device according to claim 1, wherein the structural parameters comprise at least one of the following: a depth of the structure under test, a surface roughness of the structure under test, a sidewall roughness of the structure under test, an inner diameter variation of the structure under test, an elemental distribution of the structure under test, a defect distribution of the structure under test, a stress distribution of the structure under test, or a surface crystallinity of the structure under test.

6. The device according to claim 5, wherein the structural parameters of the structure under test are determined based on the Raman scattering model and/or the reference sample database corresponding to the structure under test, each of the feature points, and the corresponding first distance, the determination of the structural parameters further comprising:

determining a bottom surface maximum point and a top surface minimum point among the multiple feature points based on the Raman scattering model and/or the reference sample database corresponding to the structure under test;

determining the depth of the structure under test based on the first distance corresponding to the bottom surface maximum point and the top surface minimum point, respectively;

wherein determining the structural parameters of the structure under test based on the collected results further comprises at least one of the following:

determining the surface roughness and/or a sidewall roughness of the structure under test based on a local intensity of a collected signal;

determining the elemental distribution of the structure under test based on a type of the collected signal; or determining any or a combination of the defect distribution, the stress distribution, and the surface crystallinity of the structure under test based on a signal range, a relative strength, and an offset of the collected results.

7. A non-destructive in-situ measurement method for high-complexity structures based on Raman analysis, wherein it is applied to a non-destructive in-situ measurement device for high-complexity structures based on Raman analysis, characterized by its use for measuring structural parameters of a structure under test within a sample under test, the device comprising:

a laser light source, wherein the laser light source is configured to emit a laser beam;

a focusing component, wherein the focusing component is configured to converge the laser beam, focusing it above a movable sample stage and position a focal plane of the focusing component at an initial position, and during a measurement process, the focal plane is controlled to move from the initial position to at least a bottom surface of the structure under test;

the movable sample stage, wherein the movable sample stage holds the sample under test and is configured to move in a plane perpendicular and/or parallel to an optical axis of the focusing component, wherein an axis of the structure under test is parallel to the optical axis and is located within a focal region of the laser beam; and a detection module, wherein the detection module collects specific Raman scattering signals returned from the sample under test after scattering the laser beam, and the structural parameters of the structure under test are determined based on collected results, the method comprising:

fixing the sample under test to the movable sample stage, and ensuring that an axial direction of the structure under test within the sample is parallel to the optical axis of the focusing component;

controlling the laser light source to emit the laser beam towards the sample under test;

controlling the focusing component such that the focal plane of the focusing component is at the initial position above the movable sample stage;

controlling the movable sample stage to move in a plane perpendicular to the optical axis, such that a position of the structure under test coincides with the focal region of the laser beam;

during the measurement, controlling the focusing component to move the focal plane from the initial position to at least the bottom surface of the structure under test;

controlling the detection module to collect the specific Raman scattering signals returned after scattering of the laser beam by the sample under test, and determining the structural parameters of the structure under test based on the collected results, wherein the determination of the structural parameters of the structure under test based on the collected results comprises:

determining a scanning curve corresponding to the focal plane based on a signal intensity of each collected result and a first distance moved by the focal plane towards the movable sample stage;

determining multiple feature points on the scanning curve and the corresponding first distance for each feature point; and determining the structural parameters of the structure under test based on a Raman scattering model and/or a reference sample database corresponding to the structure under test, the feature points, and the corresponding first distances;

wherein the Raman scattering model is created based on reflection and/or scattering Raman signal patterns of the laser beam for a structure matching the structure under test; and wherein parameters in the reference sample database are determined based on the reflection and/or scattering Raman signal patterns of the laser beam for a structure matching the structure under test.

8. The method according to claim 7, further comprising:

adjusting an aperture of an adjustable aperture to block a signal in the Raman scattering signals that does not correspond to the focal region, so that a signal corresponding to a focal region in the Raman scattering signals is incident on the detection module.

9. The method according to claim 7, further comprising:

after completing a measurement of a current structure under test, controlling the movable sample stage to move such that a next structure under test is in the focal region of the laser beam, in order to perform a measurement of the next structure under test.

10. The method according to claim 7, wherein the structural parameters comprise at least one of the following: a depth of the structure under test, a surface roughness of the structure under test, a sidewall roughness of the structure under test, an inner diameter variation of the structure under test, an elemental distribution of the structure under test, a defect distribution of the structure under test, a stress distribution of the structure under test, or a surface crystallinity of the structure under test.

11. The method according to claim 10, wherein the determination of the structural parameters of the structure under test based on the Raman scattering model and/or the reference sample database corresponding to the structure under test, each feature point, and the corresponding first distance comprises:

determining a bottom surface maximum point and a top surface minimum point among the multiple feature points based on the Raman scattering model and/or reference sample database corresponding to the structure under test;

determining the depth of the structure under test based on respective first distances corresponding to the bottom surface maximum point and the top surface minimum point;

wherein the determination of the structural parameters of the structure under test based on the collected results further comprises at least one of the following:

determining the surface roughness and/or sidewall roughness of the structure under test based on a local intensity of a collected signal;

determining the elemental distribution of the structure under test based on a type of the collected signal; or determining any or a combination of the defect distribution, the stress distribution, and the surface crystallinity of the structure under test based on a signal range, a relative strength, and an offset of the collected results.

* * * * *